(12) United States Patent
Coers et al.

(10) Patent No.: US 7,937,919 B2
(45) Date of Patent: May 10, 2011

(54) FLEXIBLE CUTTING PLATFORM WITH PASSIVE FLOAT ARM STOP IN AN AGRICULTURAL HARVESTING MACHINE

(75) Inventors: Bruce Alan Coers, Hillsdale, IL (US); Paul David Marvin, DeWitt, IA (US)

(73) Assignee: Deere & Company, Moline, IL (US)

( * ) Notice: Subject to any disclaimer, the term of this patent is extended or adjusted under 35 U.S.C. 154(b) by 744 days.

(21) Appl. No.: 11/450,220

(22) Filed: Jun. 9, 2006

(65) Prior Publication Data

US 2007/0283673 A1 Dec. 13, 2007

(51) Int. Cl.
*A01D 34/00* (2006.01)
(52) U.S. Cl. .............................. 56/15.8; 56/15.7; 56/15.9
(58) Field of Classification Search ................ 56/10.2 R, 56/10.4, 15.7–15.9, DIG. 11, 14.9–15.3; 92/129, 140
See application file for complete search history.

(56) References Cited

U.S. PATENT DOCUMENTS

| 3,818,637 | A | * | 6/1974 | Vivier .............................. 49/379 |
| 4,573,308 | A | * | 3/1986 | Ehrecke et al. ................ 56/14.4 |
| 5,203,250 | A | * | 4/1993 | Sundberg .......................... 91/51 |
| 6,202,397 | B1 | * | 3/2001 | Watts et al. ..................... 56/208 |
| 7,252,031 | B2 | * | 8/2007 | Nakamura et al. ............ 92/85 A |
| 2007/0193243 | A1 | | 8/2007 | Schmidt et al. | |

* cited by examiner

*Primary Examiner* — Alicia M Torres

(57) ABSTRACT

An agricultural harvesting machine includes a feeder housing and a cutting platform attached to the feeder housing. The cutting platform includes at least one platform section, each of which includes a frame, a plurality of float arms pivotally coupled with the frame, an endless belt carried by the plurality of float arms, and a plurality of hydraulic cylinders. Each hydraulic cylinder is associated with a respective float arm and includes a rod, a piston and a fluid chamber on a side of the piston providing a passive stop.

14 Claims, 5 Drawing Sheets

FLEXIBLE CUTTING PLATFORM WITH PASSIVE FLOAT ARM STOP IN AN AGRICULTURAL HARVESTING MACHINE

FIELD OF THE INVENTION

The present invention relates to agricultural harvesting machines, such as combines, and, more particularly to agricultural harvesting machines including a cutting platform with a belt conveyor.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat wide belt, referred to as a draper or draper belt to convey crop material. The arrangement and number of belts vary among platforms. One style of draper platform has two side belts that convey crop material laterally inwardly relative to a direction of travel, to the center of the platform, where a center feed belt moves the crop material longitudinally to the rear into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

What is needed in the art is a draper platform which is flexible across the width of the platform on a localized basis, without unduly stressing mechanical components of the draper platform.

SUMMARY OF THE INVENTION

The invention comprises, in one form thereof, an agricultural harvesting machine including a feeder housing and a cutting platform attached to the feeder housing. The cutting platform includes at least one platform section, each of which has a frame, a plurality of float arms pivotally coupled with the frame, an endless belt carried by the plurality of float arms, and a plurality of hydraulic cylinders. Each hydraulic cylinder is associated with a respective float arm and includes a rod, a piston and a fluid chamber on a side of the piston providing a passive stop.

The invention comprises, in another form thereof, a method of operating a cutting platform in an agricultural harvesting machine, including the steps of: providing at least one platform section, each of which includes a frame, a plurality of float arms movably coupled with the frame, and a plurality of hydraulic cylinders respectively associated with a corresponding float arm, each hydraulic cylinder including a rod, a piston and a fluid chamber on a side of the piston; moving the rod to a normal stop position in which the fluid chamber has a predefined volume at a predefined pressure; and moving the rod to an overload stop position in which the fluid chamber has a decreased volume at a higher pressure.

DETAILED DESCRIPTION OF THE INVENTION

Figure 1:
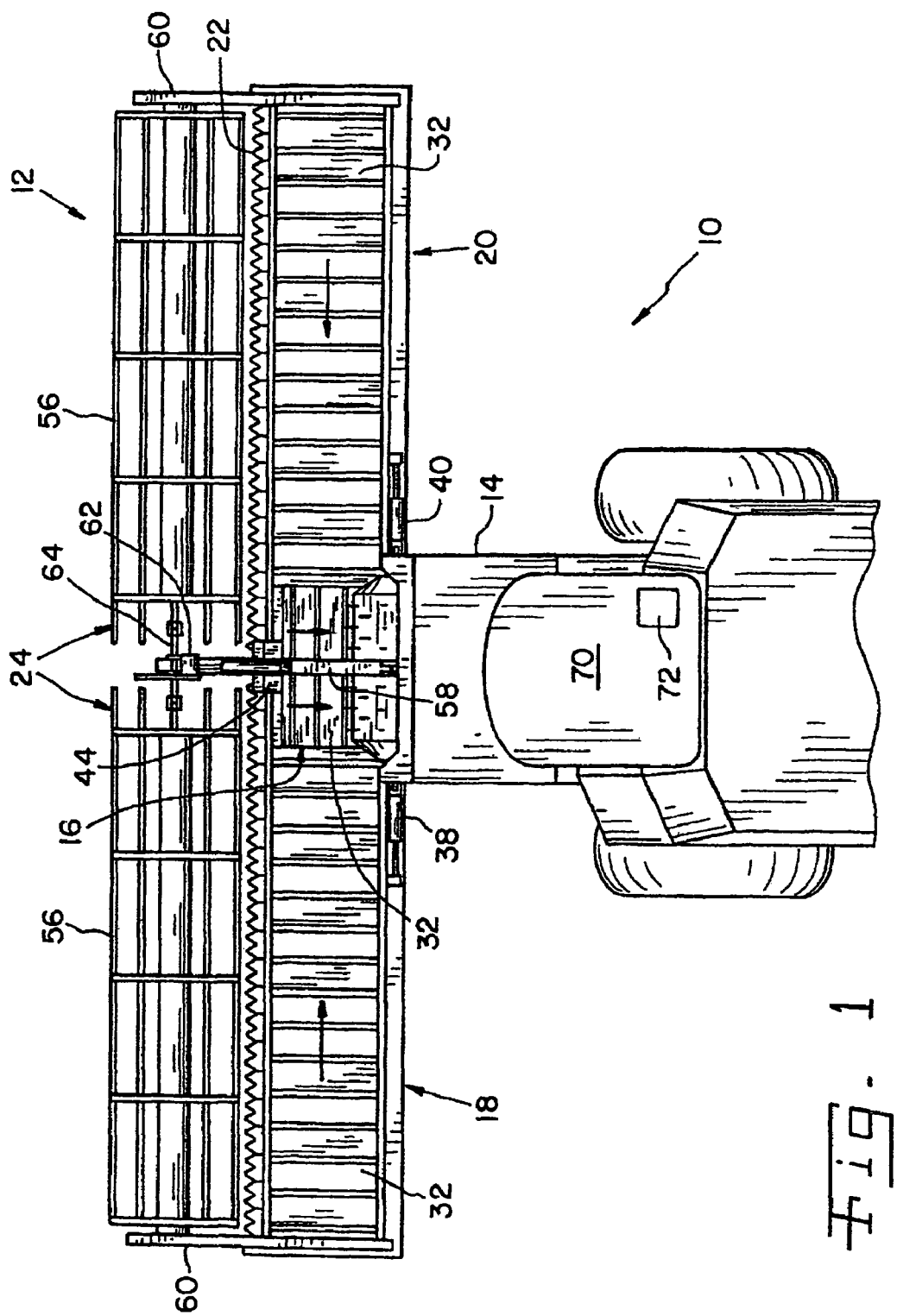
FIG. 1 is a fragmentary, top view of an agricultural combine including an embodiment of a draper platform of the present invention.
Figure 2:
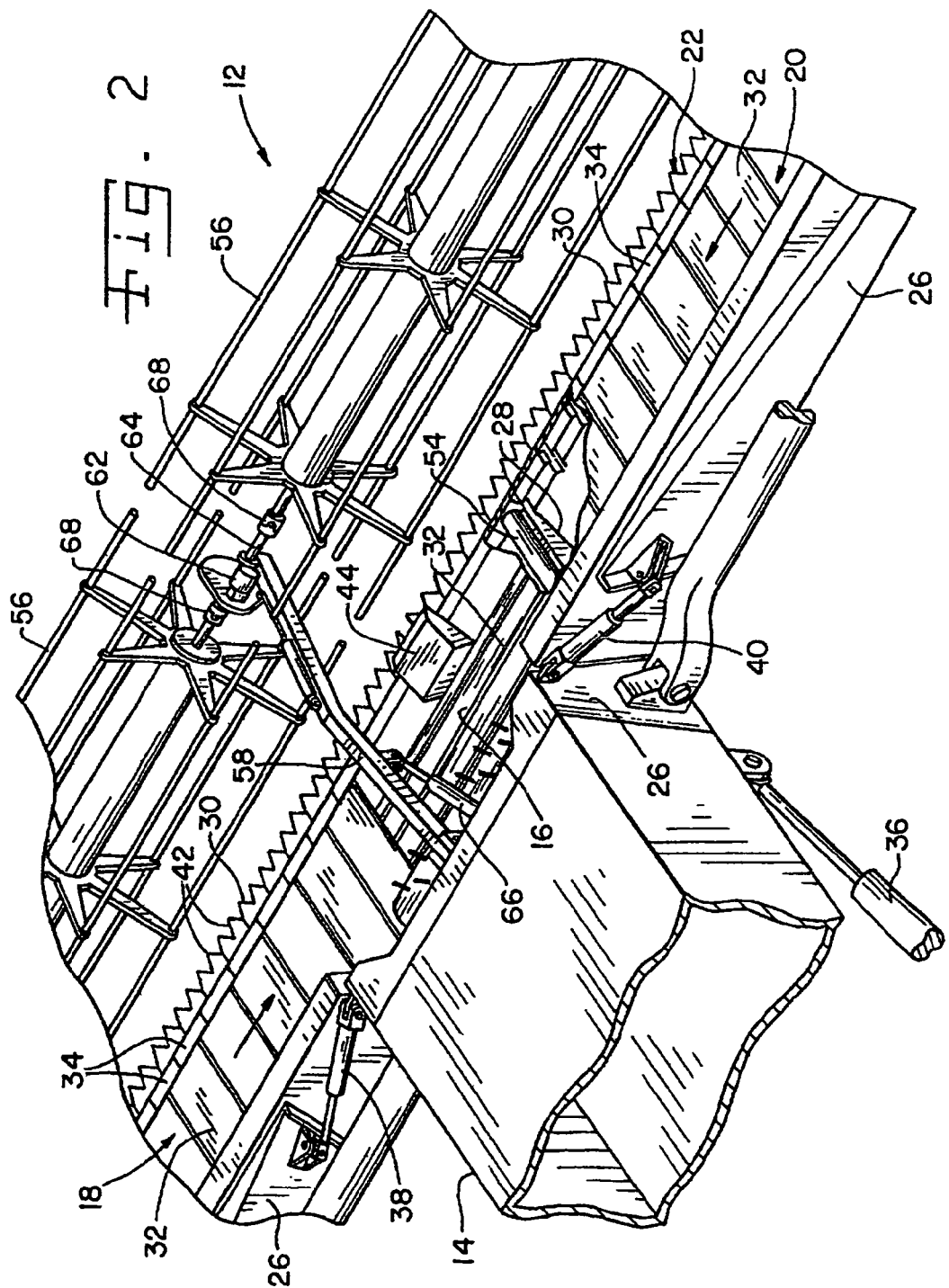
FIG. 2 is a fragmentary, perspective view of the agricultural combine of FIG. 1.

Referring now to the drawings, and, more particularly to FIGS. 1 and 2, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16,18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a double blade knife (as shown) or a single blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30. It is also possible to reciprocally drive cutterbars 30 with multiple knife drives, which can be positioned at the adjacent, inboard ends or the outboard ends of cutterbars 30.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Float arms 28 may be pivoted at their connection locations with a respective frame 26. A float cylinder 50 coupled between a respective frame 26 and float arm 28 may be used for raising or lowering the outboard end of float arm(s) 28 at the leading edge of cutting platform 12. Each float cylinder 50 may also be placed in a "float" position allowing the connected float arm 28 to generally follow the ground contour during operation. More particularly, each float cylinder 50 is fluidly connected with an accumulator 52 carried by a platform section 16, 18 or 20. Accumulator 52 allows fluid to flow to and from attached float cylinders 50 such that no pressure build-up occurs. In this manner, the rams associated with each float cylinder 50 are free to move back and forth longitudinally, thereby allowing float arms 28 to follow the ground contour. When not in a float mode, float cylinders 50 can be actuated to move float arms 28 in an upward or downward direction. In the embodiment shown, each float cylinder 50 is a hydraulic cylinder, but could possibly be configured as a gas cylinder for a particular application.

Each float arm 28 is also associated with a respective roller 54. The plurality of rollers 54 for each platform section 16,18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Figure 3:
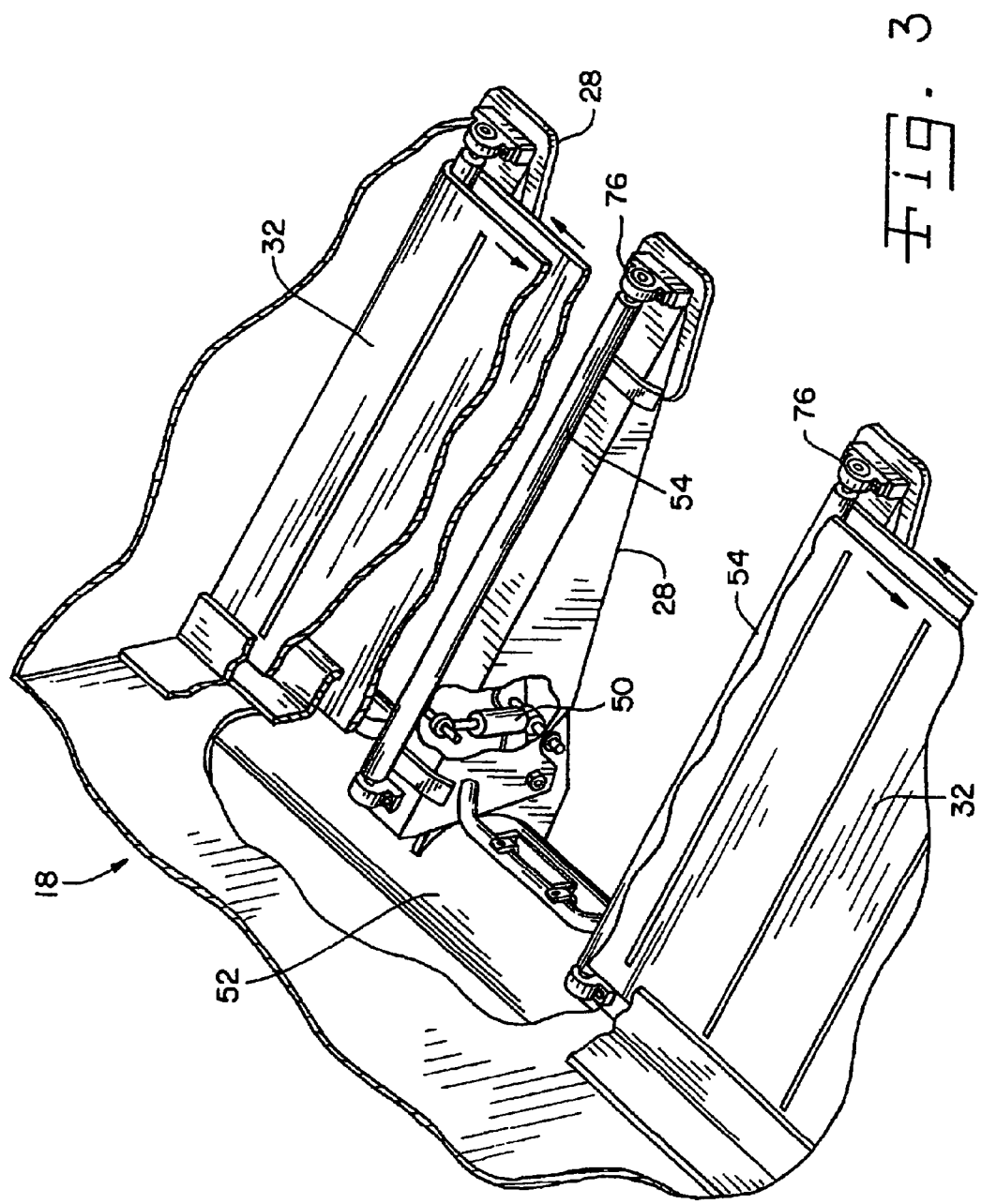
FIG. 3 is a fragmentary, perspective view of the cutting platform shown in FIGS. 1 and 2.
Figure 4:
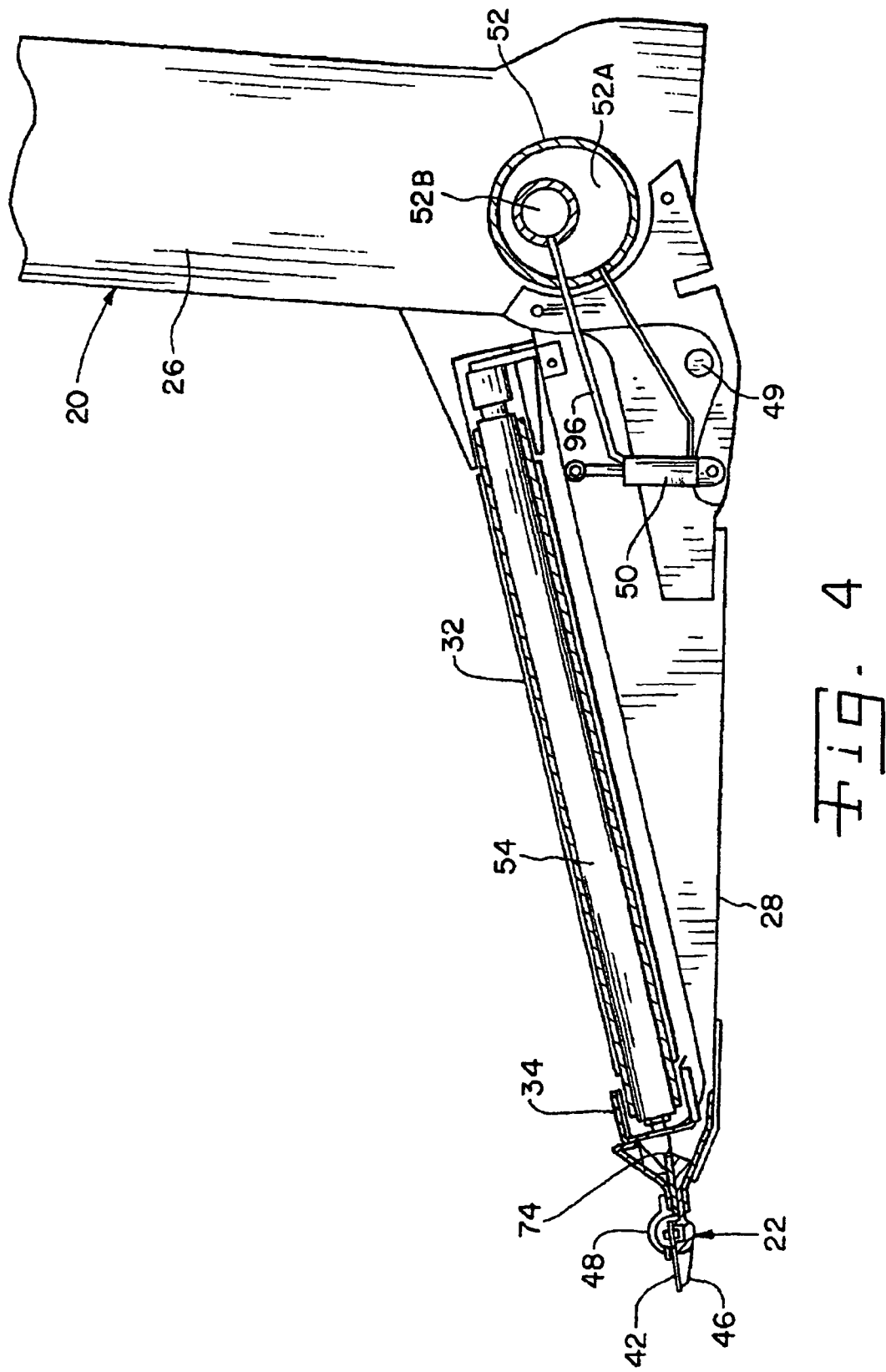
FIG. 4 is a side, sectional view through a wing platform section shown in FIGS. 1 and 2.

Each platform section 16, 18 and 20 has a leading edge which is configured to allow cutterbar assembly 22 to flex an appreciable extent in a localized manner across the width of cutting platform 12. Referring to FIGS. 3 and 4, each float arm 28 has a distal end adjacent the leading edge of cutting platform 12. The float arms 28 associated with each respective platform section 16, 18 and 20 each have a distal end which is fastened to a knife guard 46, flexible substrate 74, crop ramp 76 and hold down 48. Flexible substrate 74 for each particular platform section 16, 18 and 20 in essence forms the backbone to which the other modular components are mounted and allows flexibility of the platform section across the width thereof. A bushing housing 76 also mounted to flexible substrate 74 carries a bushing (not shown) which rotatably supports roller 54. In the embodiment shown, flexible substrate 74 is a steel plate with various mounting holes formed therein, and has a modulus of elasticity providing a desired degree of flexibility. The geometric configuration and material type from which flexible substrate 74 is formed may vary, depending upon the application.

According to an aspect of the present invention, each float arm 28 is provided with a passive stop allowing the float arm to move to a normal stop position during normal operation, and past the normal stop position to an overload stop position during an overload stop position. Such a condition may occur, for example, when cutterbar assembly 22 is biased upward in a localized manner from a ground protrusion or obstruction, such as a rock, log, mound of dirt, etc. Absent the use of a passive stop, each float arm 28 can reach a hard stop at the upper most travel position, after which further biasing by the ground protrusion may place the weight of the entire cutting platform 12 and/or feeder housing 14 on a single float arm 28. This is undesirable since the float arms 28 must be designed to accomodate such weight, which of course adds to the bulk, weight and cost of cutting platform 12. On the other hand, allowing one or more float arms 28 to pivot upwards past the normal stop position during extreme conditions prevents undue stress on the float arm, which in turn allows the size of each float arm 28 to be smaller.

Figure 5:
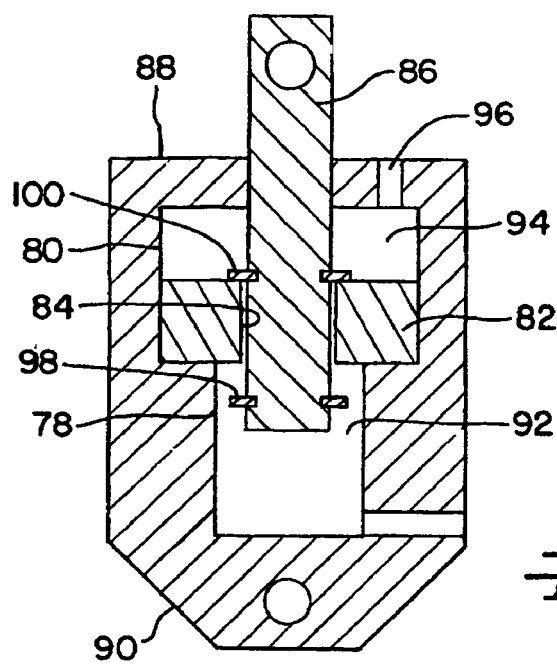
FIG. 5 is a side sectional view through an embodiment of a hydraulic passive stop of the present invention.

More particularly, referring to FIGS. 4 and 5, each float cylinder 50 can be configured as a barrel containing a stepped dual bore, with a first bore 78 and a larger diameter second bore 80. A piston 82 is free floating within second bore 80, and has an inner bore 84 with an inside diameter which s just slightly larger than an outside diameter of rod 86, with the rod 86 extending through and being secured to the piston 82 in a manner set forth below. Piston 82 is slidably movable back and forth within second bore 80 between a shoulder defined by an end of the bore 80 where it is joined to the bore 78 and a distal end 88 of the barrel of the float cylinder 50 from which rod 86 extends. Piston 82 is movable to a normal stop position shown in FIG. 5, wherein it engages a stop surface defined by the shoulder adjacent first bore 78, and an overload stop position adjacent distal end 88.

The unoccupied space within first bore 78 between piston 82 and proximal end 90 of the cylinder barrel defines a fluid chamber 92 which is variable in volume and can either be placed in a "float" state or which receives high pressure fluid from accumulator chamber 52A for extending rod 86 to lift a corresponding float arm 28. Likewise, the unoccupied space within second bore 80 between piston 82 and distal end 88 defines a fluid chamber 94 which is variable in volume and is in fluid communication with a pressure relief device in the form of an accumulator chamber 52B via fluid line 96. The pressure within accumulator chamber 52B and fluid chamber 94 is set to provide a normal stop position for rod 86. To that end, rod 86 includes a first retainer 98 and a second retainer 100 which are positioned on opposite sides of and are spaced axially from each other a distance sufficiently greater than an axial dimension of the piston so that only one of the retainers 98 and 100 will engage piston 82 at any one time. in the embodiment shown, each of first retainer 98 and second retainer 100 are configured as snap rings, but may be differently configured depending upon the application. Under normal operating conditions, rod 86 is in a float state and has a top dead center (TDC) position when first retainer 98 is against a bottom surface of piston 82, and a bottom dead center (BDC) position when second retainer 100 is against a top surface of piston 82. In the event of a localized extreme upward deflection of cutterbar assembly 22, and in turn the outboard end of float arm 28, the pressure exerted by first retainer 98 against the bottom side of piston 82 exceeds the predetermined pressure within fluid chamber 94, thus allowing upward movement of the piston 82, and, hence, further upward movement of rod 86. The fluid which is expelled from fluid chamber 94 is discharged to accumulator chamber 52B under substantially constant pressure. The maximum overload stop position occurs at a point in which second retainer 100 is engaged with distal end 88. After the overload condition passes and rod 86 is again operating in a float state, second retainer 100 reseats piston 82 against the shoulder defined at the juncture of the bores 78 and 80 when rod 86 is at the BDC position (such as when the combine header is raised at the end of the field).

For certain applications, it may also be possible to eliminate second retaining ring 100 and utilize a higher pressure within fluid chamber 94 to allow movement of piston 82 during an overload condition, and reseat piston 82 to the bottom of fluid chamber 94 when the overload condition ends and normal operation resumes.

In the embodiment shown, accumulator 52 is shown as including two eccentrically arranged accumulator chambers 52A and 52B operating at different pressures for compactness sake. However, separate accumulators each having a single accumulator chamber may also be provided.

In another embodiment, not specifically shown, fluid chamber 94 is in fluid communication with a pressure relief device in the form of a pressure relief valve which allows further movement of rod 86 past the normal stop position in the event of extreme localized deflection of cutterbar assembly 22. Fluid chamber 94 would be coupled with accumulator chamber 52B via the pressure relief valve and fluid line 96, and a check valve would be utilized to allow reverse flow moving piston 82 back to the normal stop position adjacent first bore 92 after the excessive localized flexure of cutterbar assembly 22 subsides. For example, a check valve may be coupled as a bypass in parallel with the pressure relief valve.

Figure 6:
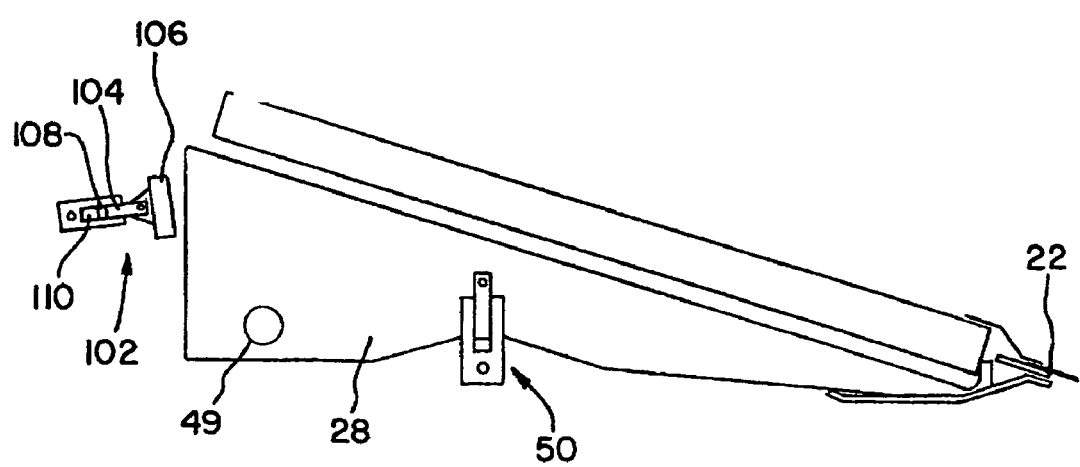
FIG. 6 is a side, schematic view of another embodiment of a hydraulic passive stop of the present invention.

Referring now to FIG. 6, there is shown another embodiment of a hydraulic passive stop 102 allowing occasional movement of float arm 28 past the normal stop position in an upward direction. In the embodiment of FIG. 6, float cylinder 50 is configured as a standard one-way cylinder with a rod 104 which can be placed in a float position or used to lift a respective float arm 28. Float arm 28 pivots about pivot pin 49 and a stop bearing 106 engages an opposite rearward end of float arm 28 (in this case the top, rearward end) when float arm 28 is pivoted upwards to a normal stop position. Stop bearing 106 is configured as a stop bearing plate in the embodiment of FIG. 6, but may also be differently configured.

Similar to the hydraulic passive stop shown in FIG. 5, passive stop 102 has a piston 108 which defines a fluid chamber 110 in communication with an accumulator and/or pressure relief valve. Fluid chamber 110 has a pressure which is set to provide a normal stop position for rod 104. In the event of a localized extreme upward deflection of cutterbar assembly 22, and in turn the outboard end of float arm 28, the pressure exerted by rod 104 and piston 108 exceeds the predetermined pressure within fluid chamber 110, thus allowing further movement of rod 104.

During harvesting operation, cutting platform 12 is placed in a "float" position as combine 10 traverses across the ground. Typically, a field is opened by making several rounds around the periphery of the field. Combine 10 is then moved back and forth across the field, with the combine being shifted approximately the width of cutting platform 12 for each pass across the field. At opposite ends of the field, the cutting platform 12 is raised while the combine is being turned around for the next pass. Under normal operating conditions, the outboard ends of float arms 28 float up and down between the top and bottom normal stop positions as cutting platform 12 moves across the field. In the event cutterbar assembly 22 encounters an abrupt localized ground protrusion, first retainer 98 exerts a force against the bottom of piston 82, and piston 82 (FIG. 5) or 108 (FIG. 6) exerts a pressure causing the hydraulic fluid to flow from fluid chamber 94 or 110, which in turn allows the end of float arm 28 to temporarily move above the normal top stop position and thereby prevent a single float arm 28 from bearing the weight of the entire cutting platform 12. This allows the size of float arms 28 to be smaller, which reduces size and manufacturing costs of the cutting platform.

Having described the preferred embodiment, it will become apparent that various modifications can be made without departing from the scope of the invention as defined in the accompanying claims.

The invention claimed is:

1. An agricultural harvesting machine, comprising:
a feeder housing;
a cutting platform attached to said feeder housing, said cutting platform including at least one platform section, each said platform section including a frame, a plurality of float arms pivotally coupled with, and extending forwardly from, said frame, a flexible cutterbar carried by forward ends of said plurality of float arms, and a plurality of float cylinders, each said float cylinder being associated with a respective one of said float arms and including a rod, a piston and a cylinder barrel, said cylinder barrel defining a bore slidably receiving said piston and forming a fluid chamber at a first side of said piston and defining a stop surface located for being engaged by a second side of said piston, with the fluid chamber containing one of a fluid under a predetermined pressure or fluid which may be loaded to create said predetermined pressure urging said piston against said stop surface, thereby providing a passive stop establishing a normal stop position for said rod during normal operation preventing said respective one of said float arms from pivoting upward a sufficient distance for causing said rod to move said piston away from said stop surface resulting in said rod moving beyond said normal stop position; said rod being mounted to said piston for permitting said rod to float axially between end limits relative to said piston during said normal operation when said piston is against said stop surface with said rod being in a normal stop position when at one of said end limits, said end limits including a first end limit and a second end limit, said first end limit being a first retainer engaging said rod located for being engaged by said first side of said piston, said second end limit being a second retainer engaging said rod located for being engaged by said second side of said piston; and
a fluid pressure relief device being coupled to said fluid chamber for operating in response to said fluid pressure in said fluid chamber exceeding said predetermined pressure to permit said rod to move beyond said normal stop position, and, hence, said float arm to move upwardly beyond a position corresponding to said normal stop position of said rod.

2. The agricultural harvesting machine of claim 1, wherein said fluid pressure relief device is one of an accumulator and a pressure relief valve.

3. The agricultural harvesting machine of claim 1, wherein each said float cylinder is a hydraulic cylinder interconnected between said frame and said respective float arm.

4. The agricultural harvesting machine of claim 1, wherein said at least one platform section includes three platform sections.

5. An agricultural harvesting machine, comprising:
a feeder housing; and
a cutting platform attached to said feeder housing, said cutting platform including at least one platform section, each said platform section including a frame, a plurality of float arms pivotally coupled with said frame and a plurality of float cylinders, each said float cylinder being associated with a respective one of said float arms and including a rod and a piston, wherein each said float cylinder is a hydraulic cylinder interconnected between said frame and said respective float arm and wherein each said float cylinder includes a cylinder barrel containing a first bore and a larger diameter second bore, said piston being slidably movable in said second bore, which defines a fluid chamber at one side of said piston, said piston having an inner bore slidably receiving said rod, said rod including a first retainer located in said first bore on an opposite side of said piston from said one side and a second retainer located in said second bore on said one side of said piston, with said first and second retainers being spaced from each other by a distance greater than an axial dimension of said piston for establishing an amount of float of said rod permitted during normal operation.

6. The agricultural harvesting machine of claim 5, wherein said second bore is positioned adjacent an end of said float cylinder from which said rod extends.

7. The agricultural harvesting machine of claim 5, wherein each of said first retainer and said second retainer comprises a snap ring.

8. A cutting platform for use with an agricultural harvesting machine, comprising:
at least one platform section, each said platform section including a frame, a plurality of float arms movably coupled with, and extending forwardly from, said frame, a flexible cutterbar carried by forward ends of said plurality of float arms, and a plurality of float cylinders, each said float cylinder being associated with a respective one of said float arms and including a rod, a piston and a cylinder barrel, said cylinder barrel defining a bore slidably receiving said piston and forming a fluid chamber at a first a side of said piston and defining a stop surface located for being engaged by a second surface of said piston, with the fluid chamber containing one of a fluid under a predetermined pressure or fluid which may be loaded to create said predetermined pressure urging said piston against said stop surface, thereby providing a passive stop establishing a normal stop position for said rod during normal operation preventing said respective one of said float arms from pivoting upward a sufficient distance for causing said rod to move said piston away from said stop surface resulting in said rod moving beyond said normal stop position; said rod being mounted to said piston for permitting said rod to float axially between end limits relative to said piston during said normal operation when said piston is against said stop surface with said rod being in the normal stop position when at one of said end limits, said end limits including a first end limit and a second end limit, said first end limit being a first retainer engaging the rod located for being engaged by said first side of said piston, said second end limit being a second retainer engaging said rod located for being engaged by said second side of said piston; and
a fluid pressure relief device being coupled to said fluid chamber for operating in response to said fluid pressure in said fluid chamber exceeding said predetermined pressure to permit said rod to move beyond said normal stop position, and, hence, said float arm to move upwardly beyond a position corresponding to said normal stop position that provides said passive stop of said rod.

9. The agricultural harvesting machine of claim 8, wherein said pressure relief device is one of an accumulator and a pressure relief valve.

10. The agricultural harvesting machine of claim 8, wherein each said float cylinder is a hydraulic cylinder interconnected between said frame and said respective float arm.

11. The agricultural harvesting machine of claim 8, wherein said at least one platform section includes three platform sections positioned in end-to-end juxtaposed relation to each other.

12. A cutting platform for use with an agricultural harvesting machine, comprising:
  at least one platform section, each said platform section including a frame, a plurality of float arms movably coupled with, and extending forwardly from, said frame, a flexible cutterbar carried by forward ends of said plurality of float arms, and a plurality of float cylinders, each said float cylinder being associated with a respective one of said float arms and including a rod and a piston providing a passive stop wherein each said float cylinder is a hydraulic cylinder interconnected between said frame and said respective one of said float arms, wherein each said float cylinder includes a cylinder barrel containing a first bore and a larger diameter second bore, said piston being slidably movable in said second bore, which defines a fluid chamber on one side of said piston; said piston having an inner bore slidably receiving said rod, said rod including a first retainer located in said first bore on an opposite side of said piston from said one side and a second retainer located in said second bore on said one side of said piston, with said first and second retainers being spaced from each other by a distance greater than an axial dimension of said piston for establishing an amount of float of said rod permitted during normal operation.

13. The agricultural harvesting machine of claim 12, wherein said second bore is positioned adjacent an end of said float cylinder from which said rod extends.

14. The agricultural harvesting machine of claim 12, wherein each of said first retainer and said second retainer comprises a snap ring.

* * * * *